United States Patent
Weiss

(10) Patent No.: US 6,172,377 B1
(45) Date of Patent: Jan. 9, 2001

(54) FLUORESCENT OPTICAL LIQUID LEVEL SENSOR

(75) Inventor: Jonathan D. Weiss, Albuquerque, NM (US)

(73) Assignee: Sandia Corporation, Albuquerque, NM (US)

( * ) Notice: Under 35 U.S.C. 154(b), the term of this patent shall be extended for 0 days.

(21) Appl. No.: 09/181,576

(22) Filed: Oct. 28, 1998

(51) Int. Cl.[7] .................. G01N 15/06; H01J 5/16
(52) U.S. Cl. ............ 250/577; 250/227.14; 250/227.25; 250/904
(58) Field of Search ..................... 250/577, 573, 250/227.11, 227.14, 227.18, 227.21, 227.23, 227.24, 227.25, 900, 901, 902, 903, 904, 905, 907; 385/12, 141, 142, 143, 144, 145

(56) References Cited

U.S. PATENT DOCUMENTS

| | | |
|---|---|---|
| H1364 * | 10/1994 | Toeppen .............................. 250/577 |
| 4,650,992 * | 3/1987 | Ruhrmann ........................... 250/577 |
| 4,727,247 * | 2/1988 | Johnston ............................. 250/577 |
| 4,870,292 * | 9/1989 | Alpert et al. ....................... 250/577 |
| 4,880,971 | 11/1989 | Danisch ............................. 340/619 |
| 4,942,306 | 7/1990 | Colbourne ......................... 250/577 |
| 4,994,682 | 2/1991 | Woodside .......................... 250/577 |
| 5,164,608 | 11/1992 | Vali et al. .......................... 250/577 |

* cited by examiner

*Primary Examiner*—John R. Lee
(74) *Attorney, Agent, or Firm*—Gregory A. Cone

(57) ABSTRACT

A liquid level sensor comprising a transparent waveguide containing fluorescent material that is excited by light of a first wavelength and emits at a second, longer wavelength. The upper end of the waveguide is connected to a light source at the first wavelength through a beveled portion of the waveguide such that the input light is totally internally reflected within the waveguide above an air/liquid interface in a tank but is transmitted into the liquid below this interface. Light is emitted from the fluorescent material only in those portions of the waveguide that are above the air/liquid interface, to be collected at the upper end of the waveguide by a detector that is sensitive only to the second wavelength. As the interface moves down in the tank, the signal strength from the detector will increase.

12 Claims, 2 Drawing Sheets

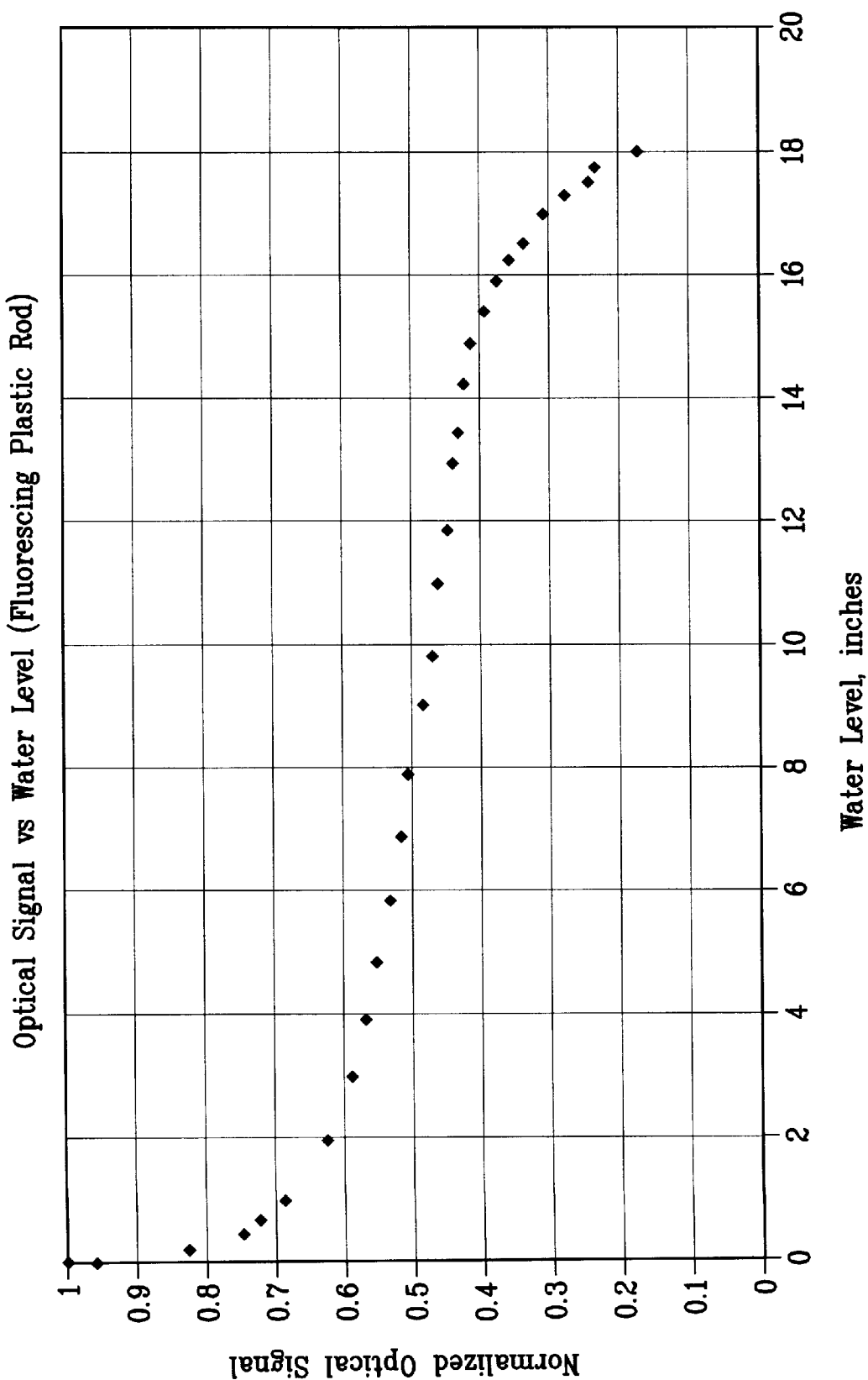

FLUORESCENT OPTICAL LIQUID LEVEL SENSOR

STATEMENT REGARDING FEDERALLY SPONSORED RESEARCH AND DEVELOPMENT

This invention was made with Government support under Contract DE-AC04-94AL85000 awarded by the U.S. Department of Energy. The Government has certain rights in the invention.

CROSS-REFERENCE TO RELATED APPLICATIONS

None.

BACKGROUND OF THE INVENTION

This invention relates to liquid level sensors, typically the sending unit for a fuel gauge. More particularly, this invention relates to liquid level sensors that employ an optical waveguide that is immersed in the fluid to provide a continuous measurement of the liquid level.

The need for continuous liquid-level measurements exists in numerous commercial and military applications, such as in the fuel, oil and water tanks of aircraft, automobiles and trucks. Less mobile applications include storage tanks or fuel dispensing, waste water, home, chemical, and food processing purposes, to name but a few. Electrical sensors are of particular concern in many cases, particularly those involving flammable fluids. Hazards are apparent from electric sparks from such sensors in these potentially explosive environments. In other environments, electromagnetic interference may overwhelm the signals generated by these sensors. Conventionally, the level of a liquid in a vessel is detected using a float with a mechanical or magnetic coupling to an external gauge, an ultrasonic or optical transducer which measures time of flight to deduce the liquid level, or a parallel wire capacitance sensor that monitors the change in the dielectric constant between the wires associated with a change in liquid level. Capacitance sensors lose accuracy with increasing amounts of water in the fuel. Sensing of fluid level by visual inspection is only viable in limited circumstances since most usage's require remote and continuous sensing of fluid levels.

A number of fluid level sensors based on fiber optics have been proposed. They are attractive because they introduce no electrical energy into the tank, are insensitive to electromagnetic interference, have no moving parts and can provide a continuous measurement of fluid level. A number of older fiber optic fluid level sensors are described in the article "Experimental Investigations on Fibre Optic Liquid Level Sensors and Refractometers," by K. Spenner et al. in IEE OFS 221 pages 96–99. These implementations employ two separate optical fibers and are primarily for the measurement of discrete levels in the vessel, e.g. to sense whether the vessel is completely full or completely empty or at some intermediate point. It would be more desirable to have a fiber optic sensor that could provide continuous measurements.

An early continuous measurement fiber optic sensor is described in "Fibre Optic Fluid Level Sensor," by M. Belderdid, N. Ghanderharioun, and B. Brennan in the Proceedings of the SPIE Conference 566 Fibre Optic and Laser Sensors IIII (1985) pages 153–158. This sensor is based on the bending or cladding loss principle, consisting of large loops of a single fibre, the loops being of ever increasing diameter and suspended in the liquid. U.S. Pat. No. 4,870,292 to Alpert et al., teaches a fluorescent doped detector fiber to collect light reflected from a source fiber in the presence of air; the light is refracted away when a fluid of higher refractive index is present. The output signal from the fluorescent doped fiber is analogous to the fluid level.

U.S. Pat. No. 4,942,306 builds upon the '292 patent above by embedding one end of the source optical fiber into a transparent substrate such that the injected light enters the substrate at such an angle that it will refract out of the substrate when the substrate is in the liquid but will continue to be totally internally reflected when the substrate is in the air above the liquid. The detecting fiber is again a separate fluorescent doped fiber that is placed against the transparent substrate, typically being wrapped in grooves around the outside of the substrate.

Nevertheless, there remains a need in the art for a simple, low cost liquid level sensor based on this fiber optic technology, preferably realized as a single optical element immersed in the fluid.

SUMMARY OF THE INVENTION

This invention comprises a single optical waveguide that contains fluorescent material therein that absorbs light at a first wavelength and emits light at a second wavelength. To one end of the waveguide is attached a light input means that introduces light of the first wavelength into the waveguide at an angle wherein total internal reflection will occur within the waveguide if the fluid adjacent to the waveguide is air. However, the refractive index of the waveguide and the angle of internal reflection within the waveguide are such that, if the waveguide is immersed in a liquid with a refractive index above a certain value, the light will dissipate into the liquid and no longer be retained within the waveguide. The light that stays within the waveguide will interact with the fluorescent material and be re-emitted as light at the second wavelength. The light at the one end of the waveguide is gathered by collection means for transfer to an optical sensor that is sensitive only to the second wavelength of light. A filter is interposed in order to block all light except that of the second wavelength from reaching this sensor. The amount of collected light at the second wavelength is a direct function of how much of the waveguide is in air rather than in the liquid. The longer the length of waveguide that supports total internal reflection of the light, the more of the fluorescent material that is exposed to the light at the first wavelength. Thus, the amount of light collected at the second wavelength monotonically increases with the length of the waveguide above the liquid if the concentration of the fluorescent material in the waveguide is constant. As a result, a relationship can be established between the strength of the received optical signal and the liquid level.

BRIEF DESCRIPTION OF THE DRAWINGS

FIG. 2 is a graph showing normalized optical signal as a function of changes in the water level surrounding a fluorescing plastic rod.

DETAILED DESCRIPTION OF THE INVENTION

Figure 1:
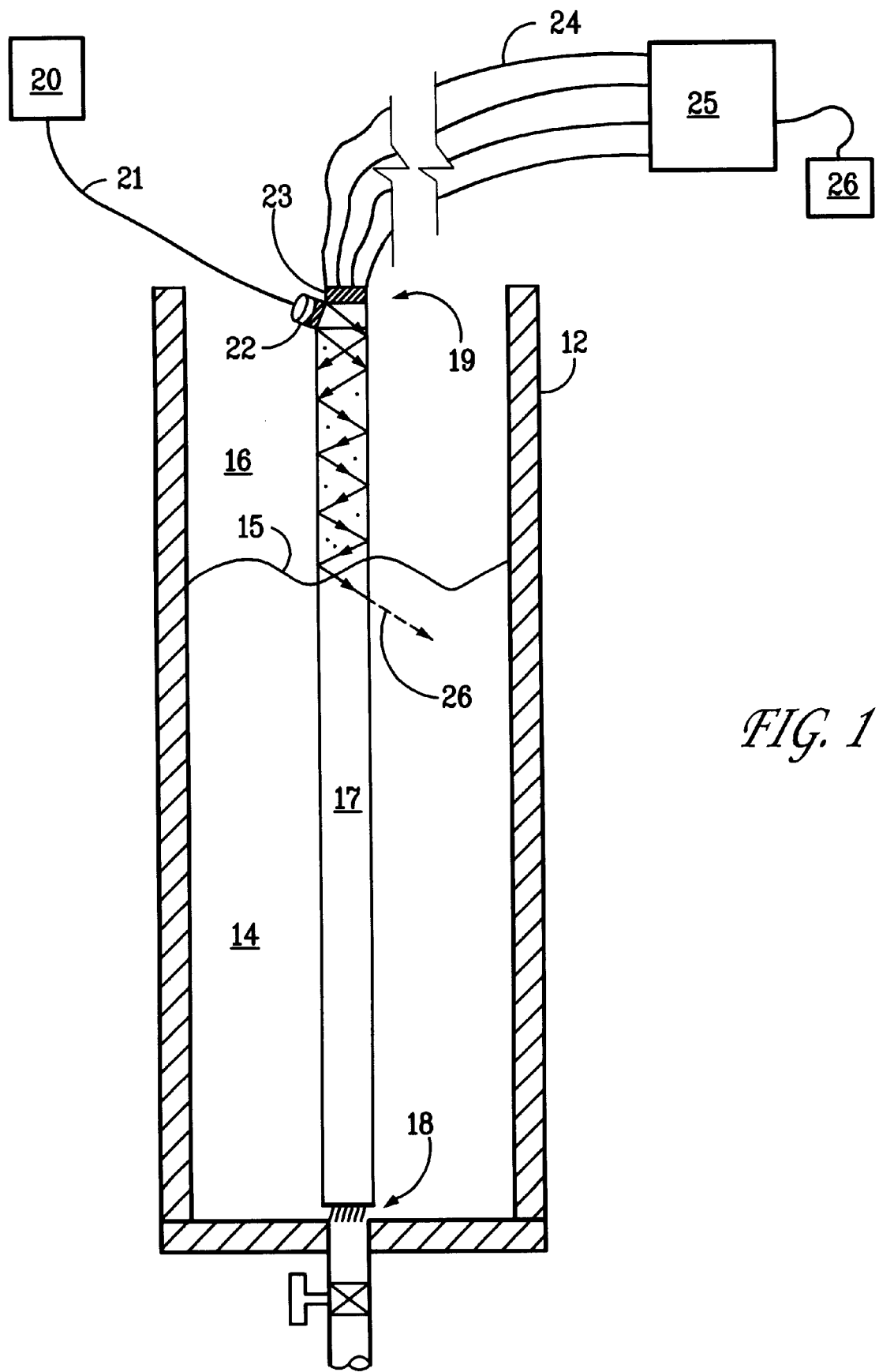
FIG. 1 is a schematic drawing of the various elements of the liquid level sensor.

The basic component of this sensor is an optical waveguide that contains fluorescent material that fluoresces in a particular wavelength region (bandwidth) when excited or pumped by light of a somewhat shorter wavelength. The waveguide is desirably made of a plastic but any other transparent material that could contain the fluorescent material and be resistant to the effects of the fluids in the tank would also work. The cross sectional shape of the waveguide is preferably polygonal and more preferably square or rectangular. A circular cross section causes the angle of incidence to vary, depending on where the light ray enters the waveguide. This will be true even if all the rays enter the front face of the guide at the same angle. In particular, the angle of incidence of a certain group of rays will be large enough that they will not refract out of the waveguide even if it is submerged in the liquid. This occurrence reduces the sensitivity of the device to liquid level, especially for liquids of low refractive index. The flat sides of a polygon or square cause the angle of incidence of all the rays to be the same for collimated light entering the waveguide. In the example below, the cross section is somewhat square but the sides are concave towards the center of the waveguide due to the way the plastic was extruded upon formation. Perfectly flat sides probably would have produced better results.

The fluorescent material used in the plastic waveguide in the example is a fluorescent dye that is distributed uniformly through the volume of the waveguide. This material absorbs light in the blue wavelengths and emits in the green wavelengths. The polystyrene waveguide with the included fluorescent material was obtained from Bicron, Inc. 12345 Kingsman Road, Newbury, Ohio 44065 and is known by the stock number BCF-91A. It is 4 mm on a side. When the fluorescent material is uniformly distributed in the waveguide, the optical signal will be of the form, $S=1-e^{kL}$, where S is the strength of the received fluorescence signal, L is the length of the guide above the liquid, and k is a constant proportional to the concentration of fluorescent material. It also depends on the wavelength of the pump light. Thus, the signal eventually saturates with the length of the guide above the liquid. One designs the sensor so that it remains responsive to liquid level changes over its entire length. The optimum value of k for this purpose is 1/L. If the concentration of fluorescent material varies as $1/(I-gx)$, where I is the intensity of the pump beam at the top of the guide, g is a constant, and x is the distance along the guide measure from the top, then a linear response will result. In this circumstance, the fall off in intensity of the pump beam as it propagates down the waveguide will be compensated for by increased amounts of fluorescent material, such that the linear response from the sensor will be obtained.

Materials other than the particular fluorescent dye employed here could be used. It may be advantageous to use a rare earth material such as neodymium that absorbs at about 800 nm and emits at about 1064 nm to get closer to the peak response for a silicon photodetector. In fact, some silicon detectors are designed so that their peak response is shifted toward this wavelength. Many other fluorescent materials are available and could be used herein. The main criteria are compatibility with the particular waveguide material being used and sufficient separation between the absorption bandwidth and the emitting bandwidth.

Referring to FIG. 1, the complete sensor system is shown. The volume or tank 12 containing the liquid 14 is shown with the interface 15 between the air 16 and the liquid 14 occurring about ⅔ up the length of the waveguide 17 that is place in the tank. The waveguide is shown here as having a mirrored end 18 opposite the top end 19 where upon are located the means to input light at the first bandwidth (the absorbing wavelengths for the fluorescent material) and the detection apparatus for the second bandwidth (the wavelengths emitted by the fluorescent material). This means to input light here comprises an incandescent light source 20 that provides broadband light to an optical fiber 21 which shines the light upon a combination collimating lens and blue filter 22. The combination element 22 optically communicates with the waveguide 17 through a beveled face at the upper end 19 of the waveguide. The bevel angle here was 45°, several degrees greater than the angle necessary to provide for total internal reflection of the blue collimated input light in the upper ⅓ of the waveguide located above the interface 15 between the air 16 and the liquid 14. The bounce paths of the input light are shown in this region of the waveguide in the figure. As the input blue light bounces down the waveguide, it excites the fluorescent material in the waveguide that in turn emits a green light, some of which travels back up the waveguide 17 to the light detection apparatus at the upper end 19 of the waveguide. The detection apparatus has a green light filter 23 adjacent the upper end 19 of the waveguide 17 to exclude all but the light emitted from the fluorescent material. The green light that passes through the filter 23 is then conveyed by a bundle of receiving optical fibers 24 to a silicon photodetector which provides an electrical measurement of the amount of the collected green light.

The liquid 14 in the tank 12 for this example was water. The fluid above the interface here was air. The interaction of the refractive indices of the waveguide 17 and the surrounding air 16 in combination with the input light bevel angle and the wavelength of the blue light provides, as explained by Snell's law, for total internal reflection of the input blue light in the waveguide 17 above the interface 15. Below the interface 15, the relatively higher refractive index of the water 14 now causes the blue light to transmit out of the waveguide into the water. This escaped light can no longer serve to activate the fluorescent material in the waveguide. Hence, the only emitted green light that is transmitted to the photodetector is light that originated above the interface 15. As the water level in the tank 12 goes down, more fluorescent material will be activated by the input blue light as it stays within the waveguide for a longer distance as the interface goes down. The mirrored end 18 increases somewhat the return of the emitted green light that strays down to the bottom of the waveguide. The mirrored end 18 also causes a large increase in signal as the interface approaches the end of the waveguide as will be discussed below.

An alternate construction, not shown, for the upper end of the waveguide would be as follows. The entire upper end of the waveguide would be beveled instead of just a portion, as described above. Adjacent and covering the beveled surface would be a single collimating lens. Located at the focal plane on the other side of the lens would be a bundle of fiber optics, a central one of which would be in optical communication with the source of pump light at the first wavelength. The surrounding fiber optics would separately communicate with the detector through the green filter, which is now located at the other end of the fiber optics, adjacent the detector, rather than having the filter abutting the nonbeveled portion of the upper end of the waveguide as above. This alternative construction is but one of several possible embodiments.

The output of the silicon photodetector 25 is, in most cases, not immediately useable. It is intended that the electrical output from the photodetector be conveyed to a suitable processor and/or analog gauge 26 so as to provide a viewer with a useful indication of the fluid level within the tank.

The response of the sensor is shown in FIG. 2. The lowest optical signal comes when the tank is fullest since the least total internal reflection takes place at this condition. Since the water was actually above the top of the waveguide at this measurement, the response is from a single pass of the input blue light across the top of the waveguide and out the other side into the water. The response when the tank goes empty is more interesting. The signal strength increases dramatically as the tank approaches empty. This is apparently because more and more of the input blue light is reflecting off the mirrored end of the waveguide and less and less is escaping into the water. This reflected blue light produces additional fluorescence as it travels upward through the waveguide. This behavior is fortunate because it means that the sensor is most sensitive when the hazard of "flying on empty" is rapidly approaching.

As was noted above, the inward concavity of the walls of the waveguide in the above example probably degraded the system response somewhat. The curved walls eventually dispersed the reflections onto the adjacent sides of the waveguide, deviating from the ideal zig-zag path down the opposing waveguide walls. This can cause a decrease in the angle of reflection within the waveguide with the undesired effect that some of the input blue light will now be reflected within the waveguide below the air-water interface. Conversely, some of the deviations may increase the angle of reflection in the waveguide to the point where some of the input blue light will escape the waveguide above the interface. Since the response of the sensor is a strong function of the doping levels of the fluorescent material and the wavelength of the input excitation light, optimization of both factors is to be expected in a particular application. For example, LED and laser sources without filters are good alternatives for the present input light source.

It should be understood that the above presented example is but one embodiment of the present invention. Many variations are possible, and the true scope of the invention is described in the appended claims. Although the example is for the measurement of the movement of an interface between air and water in a tank, an interface between any two fluids can be so measured if there is a sufficient difference between their indices of refraction. This could include measurements of the interface between two gases, a gas and a liquid, and two liquids.

What is claimed is:

1. A fluid level sensor comprising:
   means to provide light of a first wavelength;
   means to collect light of a second wavelength; and a single, continuous optical waveguide having a first refractive index that is immersed in a volume designed to contain an interface between an upper fluid and a lower fluid with different refractive indices, wherein the means to provide light and the means to collect light are in optical communication with one end of the waveguide and the waveguide contains a fluorescent material that absorbs light at the first wavelength and re-emits light at the second wavelength, such that the means to provide light introduces the light of the first wavelength into the waveguide at an angle for total internal reflection within the waveguide where the waveguide is contacted by the upper fluid and such that the refractive index of the lower fluid is such that the light of the first wavelength will no longer be reflected within the waveguide adjacent to the interface where the lower fluid contacts the waveguide and the light is transmitted into the lower fluid,
   wherein the light of the second wavelength is only emitted from the fluorescent material in the region of the waveguide that is contacted by the upper fluid, thereby providing an indication of the position of the interface between the upper and lower fluids along the length of the waveguide.

2. The sensor of claim 1 wherein the cross sectional shape of the waveguide is square or rectangular.

3. The sensor of claim 1 wherein the concentration of the fluorescent material is uniform along the length of the waveguide.

4. The sensor of claim 1 wherein the means to provide light of a first wavelength comprises an LED or a laser emitting the first wavelength.

5. The sensor of claim 1 additionally comprising a mirror at the other end of the waveguide.

6. The sensor of claim 1 wherein the second wavelength is longer than the first wavelength.

7. The sensor of claim 1 wherein one of the fluids is a gas and the other fluid is a liquid.

8. The sensor of claim 1 wherein both fluids are liquids.

9. The sensor of claim 1 wherein the means to collect light includes a photodiode that is sensitive to the light of the second wavelength.

10. The sensor of claim 9 wherein the means to collect light further includes a filter that passes the second wavelength but not the first wavelength of light.

11. The sensor of claim 1 wherein the means to provide light of a first wavelength comprises a broadband light source in combination with a filter that passes the first wavelength but not the second wavelength of light.

12. A fluid level sensor comprising:
   means to provide light of a first wavelength;
   means to collect light of a second wavelength; and
   a single, continuous optical waveguide having a first refractive index that is immersed in a volume designed to contain an interface between an upper fluid and a lower fluid with different refractive indices, wherein the means to provide light and the means to collect light are in optical communication with one end of the waveguide and the waveguide contains a fluorescent material that absorbs light at the first wavelength and re-emits light at the second wavelength with the concentration of the fluorescent material increasing as the distance away from the one end of the waveguide increases, such that the means to provide light introduces the light of the first wavelength into the waveguide at an angle for total internal reflection within the waveguide where the waveguide is contacted by the upper fluid and such that the refractive index of the lower fluid is such that the light of the first wavelength will no longer be reflected within the waveguide adjacent to the interface where the lower fluid contacts the waveguide and the light is transmitted into the lower fluid,
   wherein the light of the second wavelength is only emitted from the fluorescent material in the region of the waveguide that is contacted by the upper fluid, thereby providing an indication of the position of the interface between the upper and lower fluids along the length of the waveguide.

* * * * *